US012355288B2

(12) United States Patent
Smith et al.

(10) Patent No.: US 12,355,288 B2
(45) Date of Patent: Jul. 8, 2025

(54) USB POWER DELIVERY INTEGRATED CIRCUIT CONTROLLER WITH WIRELESS CHARGING STATION CONTROL CAPABILITY

(71) Applicant: Cypress Semiconductor Corporation, San Jose, CA (US)

(72) Inventors: Nicholaus Smith, San Diego, CA (US); Kailas Narayana Iyer, Karnataka (IN); Jegannathan Ramanujam, Bangalore (IN); Palaniappan Subbiah, San Jose, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 779 days.

(21) Appl. No.: 17/669,973

(22) Filed: Feb. 11, 2022

(65) Prior Publication Data

US 2023/0261494 A1 Aug. 17, 2023

(51) Int. Cl.
*H02J 7/00* (2006.01)
*H02J 50/12* (2016.01)

(52) U.S. Cl.
CPC ...... *H02J 7/00712* (2020.01); *H02J 7/00304* (2020.01); *H02J 7/00308* (2020.01); *H02J 50/12* (2016.02); *H02J 2207/20* (2020.01); *H02J 2207/30* (2020.01)

(58) Field of Classification Search
USPC ........................................................ 320/107
See application file for complete search history.

(56) References Cited

U.S. PATENT DOCUMENTS

| 2013/0285601 | A1* | 10/2013 | Sookprasong | ............ | H02J 5/00 320/108 |
| 2017/0187219 | A1* | 6/2017 | Nguyen | .................. | H02J 50/80 |
| 2020/0303939 | A1* | 9/2020 | Perry | .................... | H02J 7/0013 |

* cited by examiner

*Primary Examiner* — Samuel Berhanu
(74) *Attorney, Agent, or Firm* — Murphy, Bilak & Homiller, PLLC

(57) ABSTRACT

A Universal Serial Bus (USB)-Power Delivery (PD) integrated circuit (IC) controller is described. The controller includes: a first USB port configured for coupling the USB-PD IC controller to a USB power adaptor; a second port configured for coupling the USB-PD IC controller to a wireless charging station; and logic configured to control a level of a voltage output by the USB power adaptor and to control an output power level of the wireless charging station, wherein an input voltage of the wireless charging station corresponds to the voltage output by the USB power adaptor or is derived from the voltage output by the USB power adaptor. The IC controls both USB-PD and wireless power simultaneously as a system to transmit power and may limit the output power to prevent overload conditions. A corresponding wireless charging system and method of operating the wireless charging system are also described.

24 Claims, 8 Drawing Sheets

USB POWER DELIVERY INTEGRATED CIRCUIT CONTROLLER WITH WIRELESS CHARGING STATION CONTROL CAPABILITY

BACKGROUND

Wireless charging stations are used to charge batteries in mobile devices without wires, as such they typically have variable load levels that may range anywhere from 0W (no load) up to 50 W for high-speed charging applications. A flexible input power supply that may be adjusted on demand by the wireless power receiver is needed to span such a large potential power range, to meet the demanded power requirement to charge the battery at conditionally appropriate power level which may depend on current state of battery charge, ambient temperature, device temperature, device charger capacity, transmitter power potential, etc.

Typically, the transmitter of a wireless charging station connects to a receiver when a user places the receiver on a charging pad of the transmitter. The transmitter has a negotiated default power level for charging the receiver. Such systems use fixed voltage power supplies of various levels such as 5V, 9V, 12V, etc. to charge the receiver. These systems may also use variable frequency to control the delivered power.

The transmitter has a predefined resonant frequency that fundamentally determines the potential power available to the receiver, as a function of voltage (for variable voltage systems) or as a function of frequency (for variable frequency systems). Typical solutions include a fixed power adaptor input followed by a buck or buck-boost voltage regulator to adjust the voltage used as the input to the resonant tank of the transmitter of the wireless charging station. These extra regulators occupy large circuit board area, increase system losses, increase design complexity, and increase cost.

Over-voltage and over-current protection can be implemented with frequency changes or voltage changes via the wireless power transmitter. However, with multi-chip solutions where separate microcontrollers are used to control the power adaptor and the wireless charging station, there is a time latency for messaging and signaling to be sent to adjust incoming power level.

During or after wireless transmission, the input voltage from the power adaptor may need to be adjusted. These adjustments take additional programming and time for the system to execute, including inter IC communications, which adds to system development costs and decreases response time to changes in charging.

Thus, there is a need for a simplified control implementation for wireless charging stations.

SUMMARY

According to an embodiment of a Universal Serial Bus (USB)-Power Delivery (PD) integrated circuit (IC) controller, the USB-PD IC controller comprises: a first USB port configured for coupling the USB-PD IC controller to a USB power adaptor; a second port configured for coupling the USB-PD IC controller to a wireless charging station; and logic configured to control a level of a voltage output by the USB power adaptor and to control an output power level of the wireless charging station, wherein an input voltage of the wireless charging station corresponds to the voltage output by the USB power adaptor or is derived from the voltage output by the USB power adaptor.

According to an embodiment of a method of operating a wireless charging system, the method comprises: receiving power at a first Universal Serial Bus (USB) port of a USB-Power Delivery (USB-PD) integrated circuit (IC) controller from a USB power adaptor; providing power at a second port of the USB-PD IC controller to a wireless charging station; and controlling, via the USB-PD IC controller, a level of a voltage output by the USB power adaptor and an output power level of the wireless charging station, wherein an input voltage of the wireless charging station corresponds to the voltage output by the USB power adaptor or is derived from the voltage output by the USB power adaptor.

According to an embodiment of a wireless charging system, the wireless charging system comprises: a Universal Serial Bus (USB) power adaptor configured to interface with a power source and output a voltage based on the power source; a wireless charging station configured to wirelessly charge a device in charging proximity of the wireless charging station; and a USB-Power Delivery (PD) integrated circuit (IC) controller coupled to both the USB power adaptor and the wireless charging station, wherein the USB-PD IC controller is configured to control a level of the voltage output by the USB power adaptor and to control an output power level of the wireless charging station, wherein an input voltage of the wireless charging station corresponds to the voltage output by the USB power adaptor or is derived from the voltage output by the USB power adaptor.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a Universal Serial Bus (USB)-Power Delivery (PD) integrated circuit (IC) controller that is designed to control both a USB power adaptor that outputs a voltage based on a power source and a wireless charging station configured to wirelessly charge a device in charging proximity of the wireless charging station. Accordingly, only a single controller is needed to control both the USB power adaptor and the wireless charging station.

The USB-PD IC controller makes voltage decisions that optimize the input voltage to the wireless charging station for all wireless charging scenarios. The resulting reduction in circuitry also has the benefit of reduced quiescent current and lower standby power levels. In cases where the output voltage of the USB power adaptor is controllable in sufficiently small steps, a separate voltage regulator may be omitted and the USB power adaptor may provide the input voltage directly to the wireless charging station. The USB-PD IC controller may adapt to changing charging scenarios through communications from the wireless receiver and the USB power adaptor, and change the input voltage to the wireless charging station accordingly to efficiently and safely charge the battery of the wireless receiver. In some cases, both the USB power adaptor and a separate voltage regulator may be used along with frequency control at the wireless charging station to provide efficient and safe wireless battery charging.

Described next, with reference to the figures, are exemplary embodiments of the USB-PD IC controller, a wireless charging system that includes the USB-PD IC controller, and a method of operating the wireless charging system.

Figure 1:
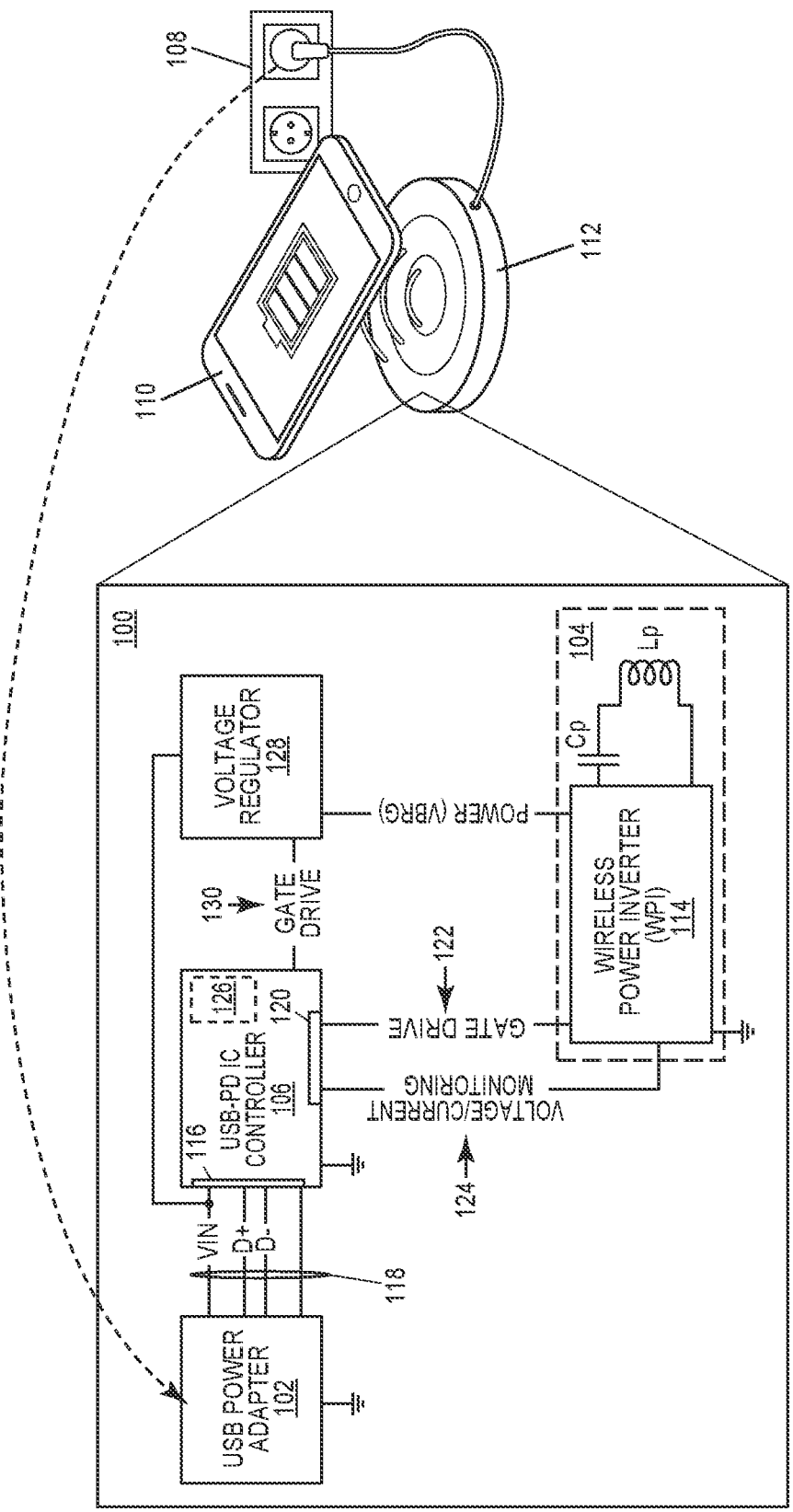
FIG. 1 illustrates a block diagram of an embodiment of a wireless charging system that includes a Universal Serial Bus (USB) power adaptor, a wireless charging station, and a USB-Power Delivery (PD) integrated circuit (IC) controller that controls both the USB power adaptor and the wireless charging station.

FIG. 1 illustrates an embodiment of a wireless charging system 100 that includes a Universal Serial Bus (USB) power adaptor 102, a wireless charging station 104, and a USB-Power Delivery (PD) integrated circuit (IC) controller 106 coupled to both the USB power adaptor 102 and the wireless charging station 104. The USB power adaptor 102 interfaces with a power source such as AC mains and outputs a voltage 'VIN' based on the power source. FIG. 1 illustrates one scenario where the USB power adaptor 102 plugs into a wall outlet 108. However, other AC power source configurations are possible. The USB power adaptor 102 may be compliant with the USB-PD specification, USB-C specification, PPS (Programmable Power Supply) specification, etc. In general, the voltage VIN output by the USB power adaptor 102 may have relatively small output voltage steps, e.g., every 20 mV, 40 mV, 100 mV, etc., or larger steps, e.g., 5V, 12V and 15V.

The wireless charging station 104 wirelessly charges a wireless charging device 110 such as a cellular phone, smartphone, PDA (personal digital assistant), PDA phone, etc. in charging proximity of the wireless charging station 104. The wireless charging station 104 may be integrated in a charging pad 112 and include a Wireless Power Inverter (WPI) 114 for wirelessly transferring power via magnetic induction to charge a battery included in the wireless charging device 110 placed on the charging pad 112. The WPI 114 may be a full-bridge or half-bridge inverter having voltage 'VBRG' as a DC input voltage, for example.

The wireless charging station 104 includes an induction coil Lp placed in a series resonant circuit with a capacitor Cp to yield a resonant circuit with a natural resonance when coupled to the corresponding coil (not shown in FIG. 1) included in the wireless charging device 110. When the wireless charging device 110 is placed on the charging pad 112, the proximity of the coils allows an electromagnetic field to be created. This electromagnetic field allows power to pass from the coil Lp in the charging pad 112 to the coil in the wireless charging device 110. The induction coil in the wireless charging device 110 uses the transferred power to charge the device battery. More than one coil may be used on the transmit and receive sides.

The same USB-PD IC controller 106 is used to control both the wireless charging station 104 and the USB power adaptor 102. The USB-PD IC controller 106 includes a first USB port 116 for coupling the USB-PD IC controller 106 to the USB power adaptor 102 over a USB cable 118. The USB-PD IC controller 106 may control the USB power adaptor 102 via D+ and D− data pins on the USB power adaptor 102.

The USB-PD IC controller 106 also includes a second port 120 for coupling the USB-PD IC controller 106 to the wireless charging station 104. The USB-PD IC controller 106 may control the wireless charging station 104 via a gate drive signal 122 provided to the WPI 114 of the wireless charging station 104. For example, the gate drive signal 122 may be a PWM (pulse width modulation) signal provided to a gate driver of the WPI 114 for controlling the gates of power transistors that form full-bridge or half-bridge inverter of the WPI 114. The USB-PD IC controller 106 may control the wireless charging station 104 based on voltage and/or current information 124 received from the wireless charging station 104.

The USB-PD IC controller 106 also includes logic 126 for controlling the level of the voltage VIN output by the USB power adaptor 102 and the output power level of the wireless charging station 104. The input voltage 'VBRG' of the wireless charging station 104 corresponds to the voltage VIN output by the USB power adaptor 102 or is derived from the voltage VIN output by the USB power adaptor 102. As explained above, the USB power adaptor output voltage VIN may have relatively small voltage steps, e.g., every 20 mV, 40 mV, 100 mV, etc.

If the degree of voltage control available at the USB power adaptor 102 is sufficient to implement the full output power range of the wireless charging station 104, the USB power adaptor output voltage VIN may be input directly as the wireless charging station input voltage VBRG and the USB-PD IC controller 106 may control the output power level of the wireless charging station 104 by changing the level of VIN and/or the operating frequency or duty cycle of the wireless charging station 104. If more granular voltage level control is needed to implement the full output power range of the wireless charging station 104, the wireless charging system 100 may also include a voltage regulator 128 such as a DC/DC switching regulator such as a buck regulator or other type of step-down converter for regulating the input voltage VBRG of the wireless charging station 104 based on the voltage VIN output by the USB power adaptor 102. In this case, the USB-PD IC controller 106 also controls the voltage regulator 128, e.g., via a gate drive signal 130 such as a PWM signal for controlling power transistors of the voltage regulator 128.

Figure 2:
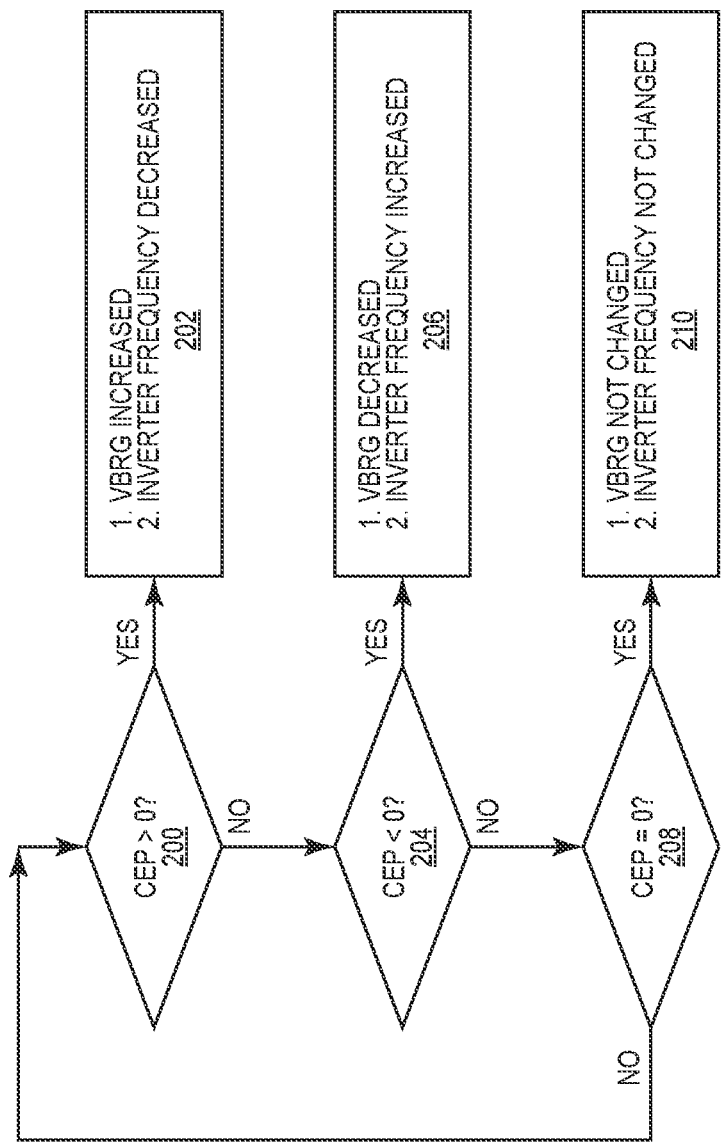
FIG. 2 illustrates a flow diagram of an embodiment of the wireless charging control algorithm implemented by the USB-PD IC controller.

The USB-PD IC controller logic 126 may be flexibly designed to control the level of the voltage VIN output by the USB power adaptor 102 and the output power level of the wireless charging station 104. FIG. 2 illustrates an embodiment of the control algorithm implemented by the USB-PD IC controller logic 126. If the wireless charging device 110 in charging proximity of the wireless charging station 104 desires more power from the wireless charging station 104, the wireless charging device 110 communicates an increase power change command 'CEP>0' to the USB-PD IC controller 106. In response (Block 200), the USB-PD IC controller logic 126 may increase the voltage input VBRG to the wireless charging station 104 and/or decrease the operating frequency or duty cycle of the wireless charging station 104 (Block 202).

Regarding input voltage control, the wireless charging station 104 may have a fixed operating frequency. In this case, the USB-PD IC controller logic 126 may increase the voltage input VBRG to the WPI of the wireless charging station 104 by commanding the USB power adaptor 102 to increase its output voltage VIN over the USB cable 118 if the USB power adaptor 102 is capable of relatively small output voltage step changes, e.g., every 20 mV, 40 mV, 100 mV, etc. Otherwise, the voltage regulator 128 would be included in the wireless charging system 100 and the USB-PD IC controller logic 126 may increase the voltage input VBRG to the WPI 114 of the wireless charging station 104 by commanding the voltage regulator 128 to increase its output voltage via the corresponding the gate drive signal 130.

Figure 3:
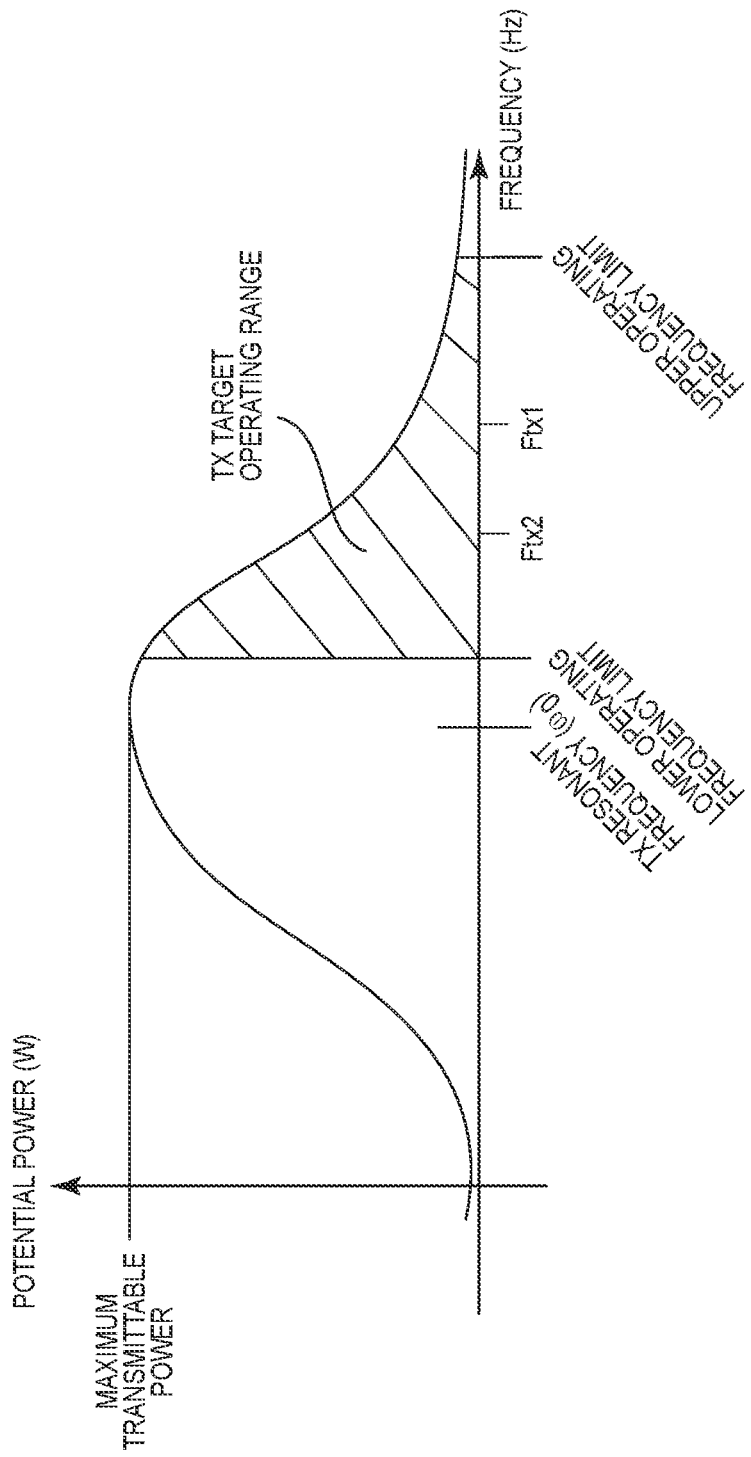
FIGS. 3 and 4 illustrate exemplary power curve functions implemented by the USB-PD IC controller for controlling the wireless charging process.

Regarding operating frequency control, the USB-PD IC controller logic 126 may maintain the operating frequency of the wireless charging station 104 in a range above a resonant frequency $\omega 0$ of the wireless charging station 104 which is determined by the series resonant circuit formed by the induction coil Lp and capacitor Cp of the wireless charging station 104. The maximum transmittable power is provided by operating the wireless charging station 104 at the resonant frequency $\omega 0$. A target transmitter (Tx) operating frequency range may be implemented by setting upper and lower operating frequency limits such that the target operating frequency range is above the resonant frequency $\omega 0$, as shown in FIG. 3. In response to the increase power change command issued by the wireless charging device 110 in charging proximity of the wireless charging station 104, the USB-PD IC controller logic 126 may decrease the operating frequency of the wireless charging station 104 within the target range via the corresponding the gate drive signal 122. Doing so results in an increase in transmittable power, since the new (adjusted) operating frequency is closer to the resonant frequency $\omega 0$. For example, in FIG. 3, the transmittable power of the wireless charging station 104 may be increased by changing the operating frequency of the wireless charging station 104 from Ftx1 to Ftx2. A similar approach may be employed for duty cycle control.

If the wireless charging device 110 in charging proximity of the wireless charging station desires less power from the wireless charging station 104, the wireless charging device 110 communicates a decrease power change command 'CEP<0' to the USB-PD IC controller 106. In response (Block 204), the USB-PD IC controller logic 126 may decrease the voltage input VBRG to the wireless charging station 104 and/or increase the operating frequency or duty cycle of the wireless charging station 104 (Block 206).

Regarding input voltage control, the wireless charging station 104 may have a fixed operating frequency and the USB-PD IC controller logic 126 may decrease the voltage input VBRG to the WPI 114 of the wireless charging station 104 by commanding the USB power adaptor 102 to decrease its output voltage VIN over the USB cable 118 if the USB power adaptor 102 is capable of relatively small output voltage step changes, e.g., every 20 mV, 40 mV, 100 mV, etc. Otherwise, the voltage regulator 128 would be included in the wireless charging system 100 and the USB-PD IC controller logic 126 may decrease the voltage input VBRG to the WPI 114 of the wireless charging station 104 by commanding the voltage regulator 128 to decrease its output voltage via the corresponding the gate drive signal 130.

Regarding operating frequency control, the USB-PD IC controller logic 126 may maintain the operating frequency of the wireless charging station 104 in a range above the resonant frequency $\omega 0$ of the wireless charging station 104 and in response to the decrease power change command 'CEP<0', increase the operating frequency within the target range via the corresponding the gate drive signal 122. Doing so results in a decrease in transmittable power, since the new (adjusted) operating frequency is further from the resonant frequency $\omega 0$. For example, in FIG. 3, the transmittable power of the wireless charging station 104 may be reduced by changing the operating frequency of the wireless charging station 104 from Ftx2 to Ftx1. A similar approach may be employed for duty cycle control.

If the wireless charging device 110 in charging proximity of the wireless charging station desires does not request a power level change (Block 208), the USB-PD IC controller logic 126 maintains the level of the input voltage VBRG to the WPI 114 of the wireless charging station 104 and maintains the operating frequency of the wireless charging station 104 (Block 210).

Figure 4:
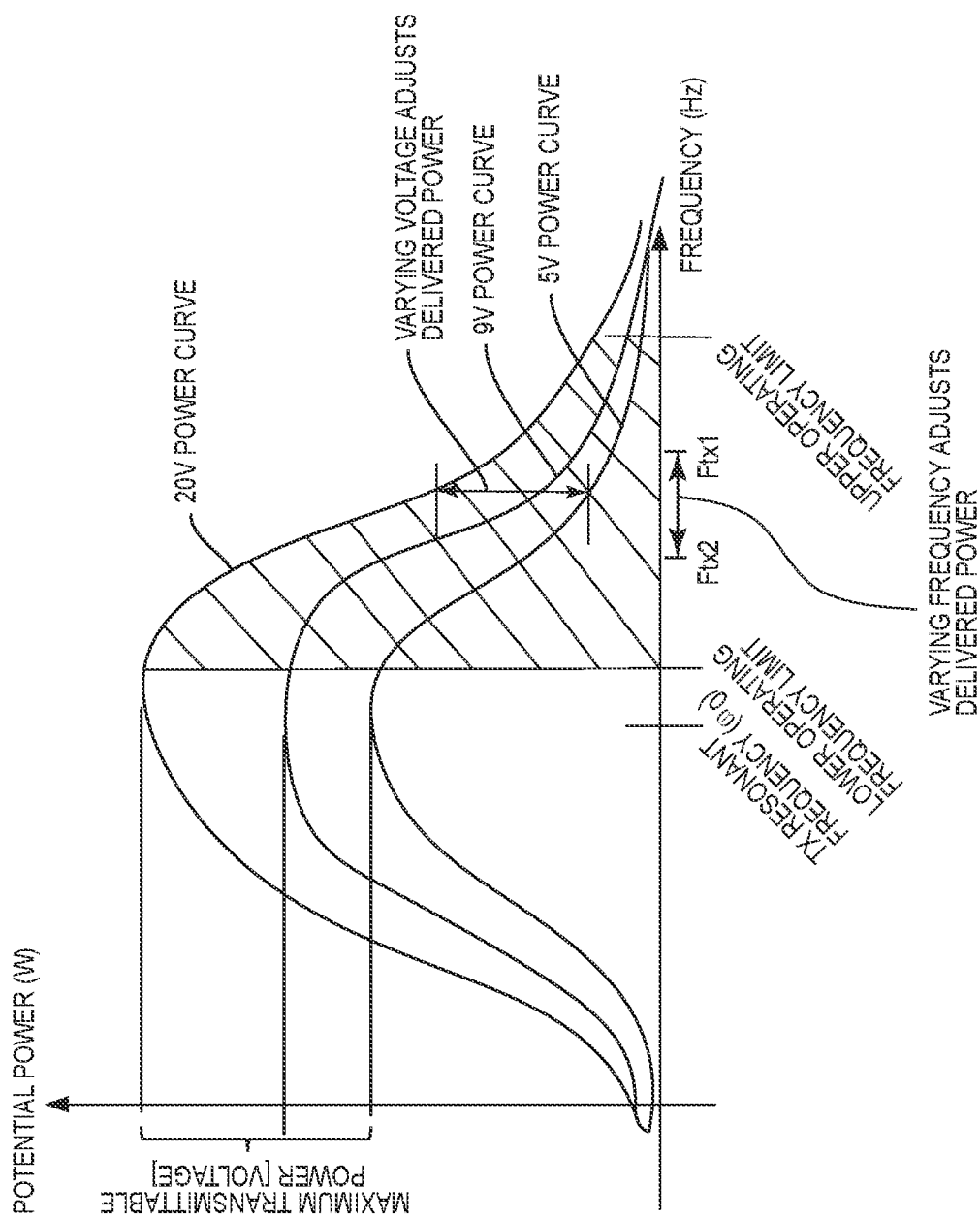

FIG. 4 illustrates an embodiment of a variable voltage system having similar power capacity when the transmitter resonance is fixed and the operating frequency is changed. However, the voltage variable enables the entire potential power curve (W) to be shifted higher or lower by changing the voltage input VBRG to the WPI 114 of the wireless charging station 104. The variable voltage system adjusts delivered power by operating the wireless charging station 104 at a fixed frequency and increasing or decreasing VBRG. The variable voltage system may also take advantage of frequency changes for additional control of power transfer at various voltage levels. By using the USB-PD IC controller 106 to implement voltage and frequency control, power can be quickly adjusted at the USB power adaptor level without the need of additional hardware or software. Since the USB power adaptor voltage VIN may be used to control the transmittable power, the USB-PD IC controller logic 126 may adjust the transmittable power by frequency adjustments and/or by voltage adjustments.

In one example, the USB power adaptor 102 may have relatively larger output voltage steps, e.g., 5V, 9V and 20V, where each output voltage level of the USB power adaptor 102 defines a different power curve. For each power curve, the USB-PD IC controller logic 126 may define a target operating frequency range for the wireless charging station 104 by setting upper and lower operating frequency limits such that the target operating frequency range is above the resonant frequency $\omega 0$ the wireless charging station 104. The USB-PD IC controller logic 126 may change the transmit power level of the wireless charging station 104 by changing the operating frequency or duty cycle of the wireless charging station 104 while VBRG remains fixed, by changing the level of VBRG while the operating frequency and/or duty cycle of the wireless charging station 104 remains fixed, or by changing both the operating frequency or duty cycle of the wireless charging station 104 and the level of VBRG.

For example, in FIG. 4, the transmittable power of the wireless charging station 104 may be increased by changing the output voltage VIN of the USB power adaptor 102 from 5V (or 9V) to 9V (or 20V) while maintaining the same operating frequency for the WPI 114 of the wireless charging station 104, or decreased by changing VIN from 20V (or 9V) to 9V (or 5V) while maintaining the same operating frequency for the WPI 114, as indicated by the vertical line with arrows in FIG. 4. Separately or in combination, the operating frequency (or duty cycle) of the wireless charging station 104 may be increased or decreased within the target range to change the transmittable power of the wireless charging station 104. For example, in FIG. 4, the transmittable power of the wireless charging station 104 may be increased by changing the operating frequency of the wireless charging station 104 from Ftx1 to Ftx2 or decreased by changing the operating frequency from Ftx2 to Ftx1, as indicated by the horizontal line with arrows in FIG. 4.

In FIG. 4, the level of VBRG is changed by relatively coarse output adjustments at the USB power adaptor 102. However, finer power curve changes may be implemented if the USB power adaptor 102 is capable of relatively small output voltage step changes, e.g., every 20 mV, 40 mV, 100 mV, etc. or if the voltage regulator 128 is included in the wireless charging system 100. For example, if the voltage regulator 128 is included in the wireless charging system 100, the USB-PD IC controller logic 126 may change the output voltage level of both the USB power adaptor 102 and the voltage regulator 128 to control the transmit power level of the wireless charging station 104. Separately or in combination with changing the output voltage level of the USB adaptor 102 and/or voltage regulator 128 to control the transit power level of the wireless charging station 104, the USB-PD IC controller logic 126 also may change the operating frequency or duty cycle of the wireless charging station 104, e.g., as described in connection with FIGS. 2 through 4. For power requests greater than 15 W (e.g., up to 50 W or higher) from the wireless charging device 110 in charging proximity of the wireless charging station 104, the USB-PD IC controller logic 126 may change both the level of the voltage VBRG input to the WPI 114 of the wireless charging station 104 and the operating frequency or duty cycle of the wireless charging station 104. As explained above, the level of the voltage VBRG input to the WPI 114 of the wireless charging station 104 may be changed at the USB power adaptor 102 and/or the voltage regulator 128.

Figure 5:
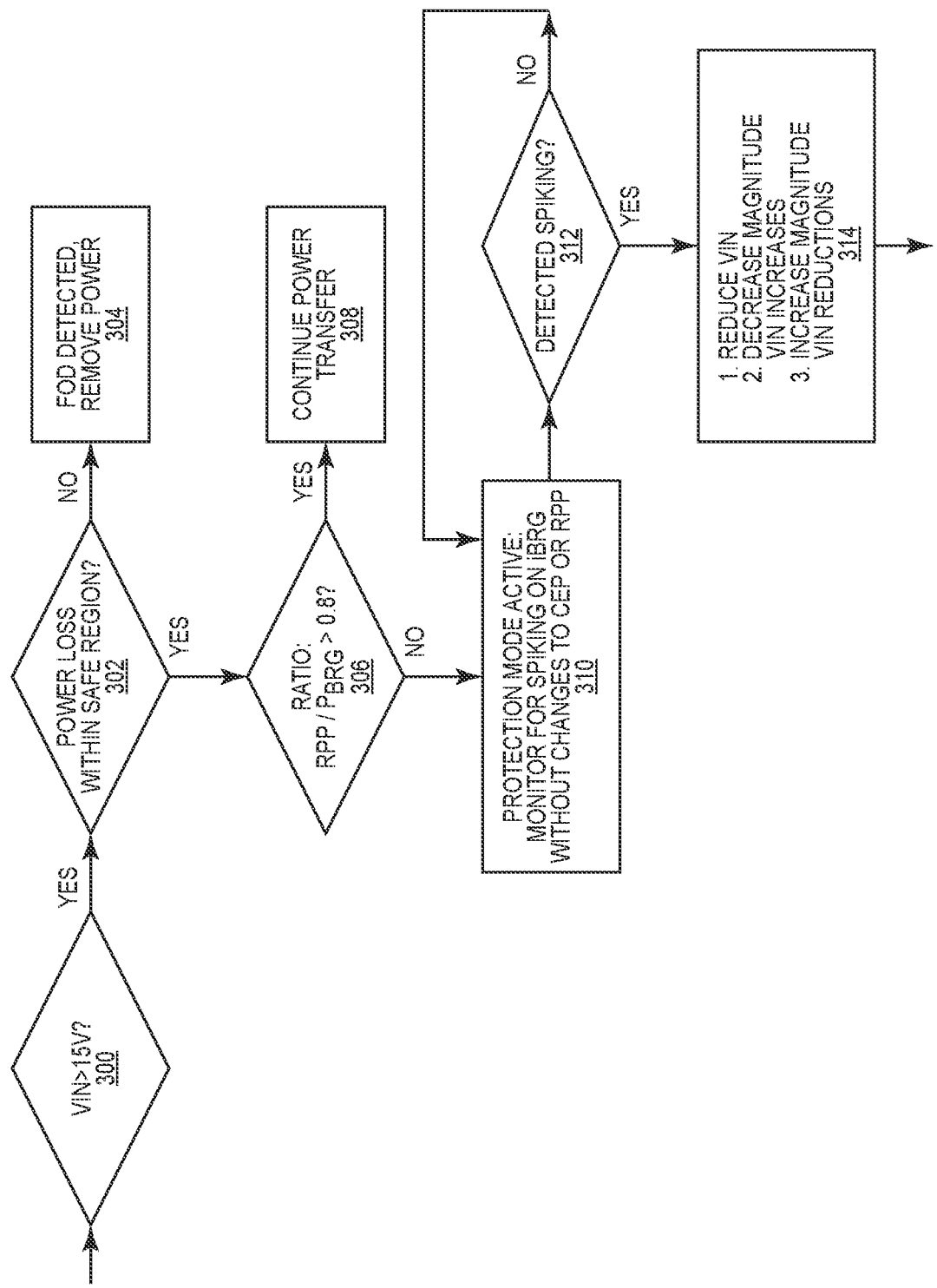
FIG. 5 illustrates a flow diagram of an embodiment of an over-current/over-voltage handling algorithm implemented by the USB-PD IC controller, including a protection mode of operation.

FIG. 5 illustrates an embodiment of an over-current/over-voltage handling algorithm implemented by the USB-PD IC controller logic 126. Over-current and over-voltage conditions can lead to individual component failure and possibly even system failure and should be mitigated.

If the output voltage VIN of the USB power adaptor 102 exceeds a certain level (e.g., 15V in Block 300), the USB-PD IC controller logic 126 determines whether the resulting power loss is within a safe operating region (Block 302). If the power loss is outside the safe operating region, the USB-PD IC controller 106 detects an FOD (Foreign Object Detection) condition and removes the power provided by the USB power adaptor 102 to prevent component damage (Block 304). Otherwise, wireless charging operation may continue.

When operating in the wireless charging mode, the USB-PD IC controller logic 126 may use a mathematical model of the transmitter-to-receiver system to estimate the received power level 'RPP' at the wireless charging device 110 that is in charging proximity of the wireless charging station 104. Input to the mathematical model may include the voltage and/or current information 124 provided by the wireless charging station 104. If the ratio of the estimated received power level RPP to the input power '$P_{BRG}$' of the wireless charging station 104 is within an acceptable limit (e.g., 0.8 in Block 306), the USB-PD IC controller logic 126 allows the wireless charging to continue (Block 308).

The USB-PD IC controller logic 126 may also activate a protection mode (Block 310). In the protection mode, the USB-PD IC controller logic 126 monitors the power input to the WPI 114 of the wireless charging station 104 for spikes in the current 'iBRG'. The USB-PD IC controller logic 126 monitors whether spikes occur in iBRG without a power change command CEP or a change in the estimated received power level RPP (Block 312). If spikes occur in iBRG without a power change command CEP or a change in the estimated received power level RPP, the USB-PD IC controller logic 126 may autonomously (without external command or instruction) reduce the level of the voltage output VIN by the USB power adaptor 102 while maintaining operation of the wireless charging station 104 (Block 314).

For example, if an increase or decrease in VIN is not warranted, the USB-PD IC controller logic 126 may still autonomously reduce the level of VIN. If an increase in VIN has been determined or requested, the USB-PD IC controller logic 126 may autonomously lower the magnitude of the determined increase in VIN. Accordingly, the effective increase in VIN is reduced. If a decrease in VIN has been determined or requested, the USB-PD IC controller logic 126 may autonomously increase the magnitude of the determined decrease in VIN. Accordingly, the effective decrease in VIN is enlarged.

Figure 6:
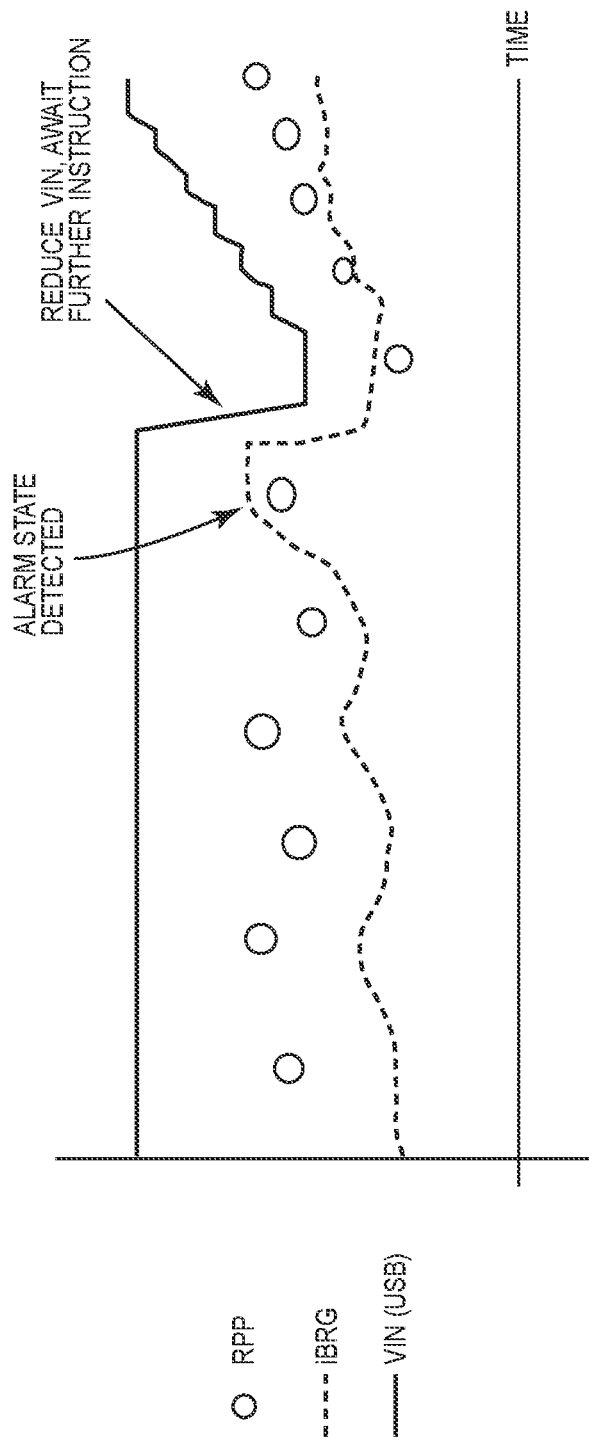
FIG. 6 illustrates a waveform diagram of an example where an alarm state is detected in the protection mode.

FIG. 6 illustrates an example where an alarm state is detected in the protection mode, when the input current iBRG to the wireless charging station 104 spikes above the estimated received power level RPP in the absence of a power change command CEP. In response, the USB-PD IC controller logic 126 reduces the level of the output voltage VIN of the USB power adaptor 102 and awaits further instruction. If iBRG subsequently spikes above the estimated received power level RPP in the alarm state, the USB-PD IC controller logic 126 may autonomously reduce increases in VIN or autonomously enlarge decreases in VIN.

Figure 7:
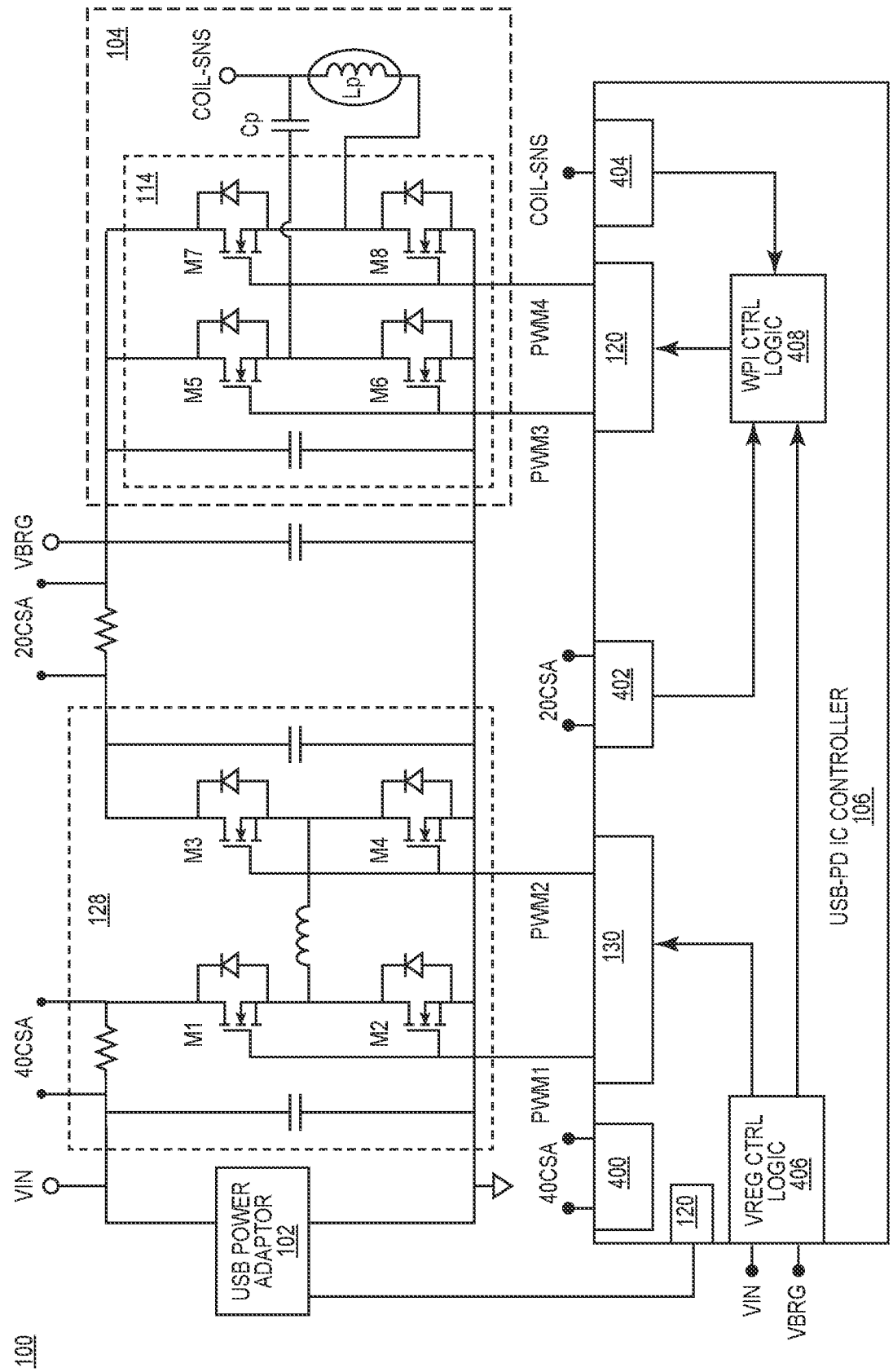
FIG. 7 illustrates a block diagram of an embodiment of the USB-PD IC controller.

FIG. 7 illustrates an embodiment of the wireless charging system 100. The voltage regulator 128 is illustrated as a buck or buck-boost regulator, depending on the number of power switches M1-M4 used. The WPI 114 of the wireless charging station 104 is illustrated as a full-bridge inverter having two branches formed by respective pairs of series-connected high-side and low-side power switches M5/M6, M7/M8. The USB-PD IC controller 106 is illustrated with a first current sense input 400 for sensing the voltage across a current sense resistor '40CSA' of the voltage regulator 128, a second current sense input 402 for sensing the voltage across a current sense resistor '20CSA' at the input of the WPI 114 of the wireless charging station 104, and a third current sense input 404 for sensing the current 'COIL-SNS' in the induction coil Lp of the wireless charging station 104. The USB power adaptor output voltage VIN and the input voltage VBRG to the WPI 114 of the wireless charging station 104 are also input to the USB-PD IC controller 106.

The USB-PD IC controller logic 126 includes voltage regulation ('VREG') control ('CTRL') logic 406 for generating PWM control signals PMW1, PWM2 for controlling the switching state of the power switches M1-M4 of the voltage regulator 1128, to implement the voltage adjustment techniques described herein. The voltage regulation control logic 406 may implement the desired voltage level control at the USB power adaptor 102 and/or the voltage regulator 128.

The USB-PD IC controller logic 126 also includes WPI control logic 408 for generating PWM control signals PMW3, PWM4 for controlling the switching state of the power switches M5-M8 of the WPI 114 of the wireless charging station 104, to implement the operating frequency (or duty cycle) adjustment techniques and over-current/over-voltage handling techniques described herein.

Figure 8:
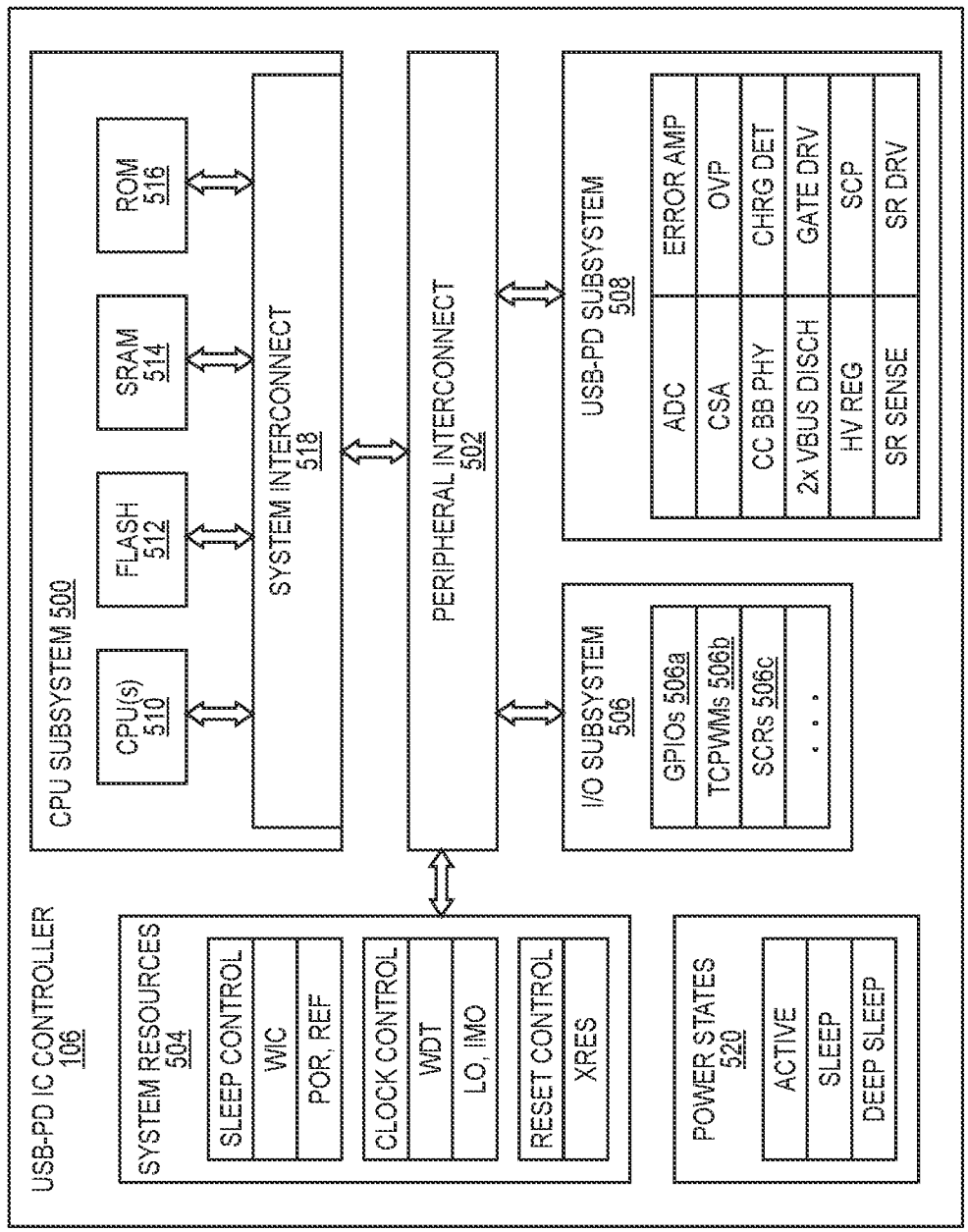
FIG. 8 illustrates a block diagram of an embodiment of a semiconductor device that is configured in accordance with the wireless charging techniques described herein.

FIG. 8 illustrates an example semiconductor device that is configured in accordance with the wireless charging techniques described herein. In the embodiment illustrated in FIG. 8, the USB-PD IC controller 106 may be implemented as a single-chip IC controller manufactured on a semiconductor die. In another example, the USB-PD IC controller 106 may be a single-chip IC that is manufactured as a System-on-Chip (SoC). In other embodiments, the USB-PD IC controller 106 may be a multi-chip module encapsulated in a single semiconductor package.

Referring to FIG. 8, the USB-PD IC controller 106 includes a CPU (Central Processing Unit) subsystem 500, peripheral interconnect 502, system resources 504, input/output (I/O) subsystem 506, USB-PD subsystem 508, and various terminals (e.g., pins) that are configured for receiving and sending signals.

The CPU subsystem 500 may include one or more CPUs 510, flash memory 512, SRAM (Static Random Access Memory) 514, ROM (Read Only Memory) 516, etc. that are coupled to system interconnect 518. Each CPU 510 is a suitable processor that can operate in an IC or a SoC device. The flash memory 512 is non-volatile memory (e.g., NAND flash, NOR flash, etc.) that is configured for storing data, programs, and/or other firmware instructions. The flash memory 512 is tightly coupled within the CPU subsystem 500 for improved access times. The SRAM 514 is volatile memory that is configured for storing data and firmware instructions accessed by each CPU 510. The ROM 516 is read-only memory (or other suitable storage medium) that is configured for storing boot-up routines, configuration parameters, and other firmware parameters and settings. The system interconnect 518 is a system bus (e.g., a single-level or multi-level Advanced High-Performance Bus, or AHB) that is configured as an interface that couples the various components of the CPU subsystem 500 to each other, as well as a data and control interface between the various components of the CPU subsystem 500 and the peripheral interconnect 502.

The peripheral interconnect 502 is a peripheral bus (e.g., a single-level or multi-level AHB) that provides the primary data and control interface between the CPU subsystem 500 and its peripherals and other resources, such as the system resources 504, the I/O subsystem 506, and the USB-PD subsystem 508. The peripheral interconnect 502 may include various controller circuits (e.g., direct memory access, or DMA controllers), which may be programmed to transfer data between peripheral blocks without burdening the CPU subsystem 500. In various embodiments, each of the components of the CPU subsystem 500 and the peripheral interconnect 502 may be different with each choice or type of CPU, system bus, and/or peripheral bus.

The system resources 504 include various electronic circuits that support the operation of the USB-PD IC controller 106 in its various states and modes. For example, the system resources 504 may include a power subsystem having analog and/or digital circuits required for each controller state/mode such as, for example, sleep control circuits, wake-up interrupt controller (WIC), power-on-reset (POR), voltage and/or current reference (REF) circuits, etc. In some embodiments, the power subsystem may also include circuits that allow the USB-PD IC controller 106 to draw and/or provide power from/to external sources with several different voltage and/or current levels and to support controller operation in several power states 520 (e.g., such as active state, sleep state, and a deep sleep state with clocks turned off). Further, in some embodiments the CPU subsystem 500 may be optimized for low-power operation with extensive clock gating and may include various internal controller circuits that allow the CPU subsystem 500 to operate in the various power states 520. For example, the CPU subsystem 500 may include a wake-up interrupt controller that is configured to wake the CPU subsystem 500 from a sleep state, thereby allowing power to be switched off when the IC chip is in the sleep state. The system resources 504 may also include a clock subsystem having analog and/or digital circuits for clock generation and clock management such as, for example, clock control circuits, watchdog timer (WDT) circuit(s), internal low-speed oscillator (ILO) circuit(s), and internal main oscillator (IMO) circuit(s), etc. The system resources 504 may also include analog and/or digital circuit blocks that provide reset control and support external reset (XRES).

The I/O subsystem 506 includes several different types of I/O blocks and subsystems. For example, the I/O subsystem 504 includes GPIO (general purpose input output) blocks 506a, TCPWM (timer/counter/pulse-width-modulation) blocks 506b, and SCBs (serial communication blocks) 506c. The GPIOs 506a include analog and/or digital circuits configured to implement various functions such as, for example, pull-ups, pull-downs, input threshold select, input and output buffer enabling/disabling, multiplex signals connected to various I/O pins, etc. The TCPWMs 506b include analog and/or digital circuits configured to implement timers, counters, pulse-width modulators, decoders and various other analog/mixed signal elements that are configured to operate on input/output signals. The SCBs 506c include analog and/or digital circuits configured to implement various serial communication interfaces such as, for example, I2C, SPI (serial peripheral interface), UART (universal asynchronous receiver/transmitter), CAN (Controller Area Network) interface, CXPI (Clock eXtension Peripheral Interface), etc.

The USB-PD subsystem 508 provides the interface to a power connector such the USB power adaptor 102 shown in FIG. 1. As used herein, "USB-PD subsystem" refers to one or more logic blocks and other analog/digital hardware circuitry, which may be controllable by firmware and which is configured and operable to perform the functions and to satisfy the requirements specified in at least one release of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables (e.g., up to 5 A of current at up to 20V, for a total of up to 100 W of power). The USB-PD specification also defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging).

Among other circuitry, the USB-PD subsystem 508 may include: one or more analog-to-digital convertors (ADCs) for converting various analog signals to digital signals; an error amplifier (ERROR AMP) for controlling the power source voltage applied to the VBUS line per a PD contract; a current sense amplifier (CSA) and an over-voltage protection (OVP) circuits for providing over-current and over-voltage protection on the VBUS line with configurable thresholds and response times; a charge detector logic block (CHRG DET) connected to the DP and DM lines for detecting conventional battery chargers conforming to various standard and proprietary battery charging specifications; at least two on-die discharge (VBUS DISCH) circuits that can discharge a VBUS line voltage to any of range of programmable voltage levels; one or more gate drivers (GATE DRV) for controlling the power switches that turn on and off the provision of power over the VBUS line; a high voltage regulator (HV REG) for converting the power supply voltage to the precise voltage (e.g., 3-5V) needed to power the USB-PD IC controller 106; a short circuit protection block (SCP) for additional short circuit detection across an external resistor coupled on the ground return path; and a SR sense logic block (SR SENSE) and a SR driver logic block (SR DRV) for implementing false negative sense (NSN) detection.

In accordance with the wireless charging techniques described herein, the USB-PD subsystem 820 includes a communication channel (PHY) logic for supporting communications with the USB power adaptor 102 on a Type-C Communication Channel (CC) line and for supporting communications with the wireless charging station 104. This includes communication channel logic for implementing the control and telemetry signalling 122, 124, 130 described herein.

Although the present disclosure is not so limited, the following numbered examples demonstrate one or more aspects of the disclosure.

Example 1. A Universal Serial Bus (USB)-Power Delivery (PD) integrated circuit (IC) controller, the USB-PD IC controller comprising: a first USB port configured for coupling the USB-PD IC controller to a USB power adaptor; a second port configured for coupling the USB-PD IC controller to a wireless charging station; and logic configured to control a level of a voltage output by the USB power adaptor and to control an output power level of the wireless charging station, wherein an input voltage of the wireless charging station corresponds to the voltage output by the USB power adaptor or is derived from the voltage output by the USB power adaptor.

Example 2. The USB-PD IC controller of example 1, wherein in response to a power change command issued by a wireless charging device in charging proximity of the wireless charging station, the logic is configured to change the level of the voltage output by the USB power adaptor and/or an operating frequency or duty cycle of the wireless charging station.

Example 3. The USB-PD IC controller of example 1 or 2, wherein the logic is configured to maintain an operating frequency of the wireless charging station in a range above a resonant frequency of the wireless charging station, and wherein in response to an increase power change command issued by a wireless charging device in charging proximity of the wireless charging station, the logic is configured to decrease the operating frequency within the range.

Example 4. The USB-PD IC controller of any of examples 1 through 3, wherein the logic is configured to maintain an operating frequency of the wireless charging station in a range above a resonant frequency of the wireless charging station, and wherein in response to a decrease power change command issued by a wireless charging device in charging proximity of the wireless charging station, the logic is configured to increase the operating frequency within the range.

Example 5. The USB-PD IC controller of example 1 or 2, wherein the wireless charging station has a fixed operating frequency, and wherein in response to a power change command issued by a wireless charging device in charging proximity of the wireless charging station, the logic is configured to change the level of the voltage output by the USB power adaptor.

Example 6. The USB-PD IC controller of example 5, wherein in response to an increase power change command issued by the wireless charging device, the logic is configured to increase the level of the voltage output by the USB power adaptor.

Example 7. The USB-PD IC controller of example 5 or 6, wherein in response to a decrease power change command issued by the wireless charging device, the logic is configured to decrease the level of the voltage output by the USB power adaptor.

Example 8. The USB-PD IC controller of any of examples 1 through 7, wherein for power requests greater than 15 W from a wireless charging device in charging proximity of the wireless charging station, the logic is configured to change the level of the voltage output by the USB power adaptor and the operating frequency or duty cycle of the wireless charging station.

Example 9. The USB-PD IC controller of any of examples 1 through 8, wherein the input voltage of the wireless charging station is provided by a voltage regulator that is configured to regulate the input voltage of the wireless charging station based on the voltage output by the USB power adaptor, and wherein the logic is configured to control the voltage regulator.

Example 10. The USB-PD IC controller of example 9, wherein in response to a power change command issued by a wireless charging device in charging proximity of the wireless charging station, the logic is configured to change the level of the voltage provided by the voltage regulator and/or an operating frequency or duty cycle of the wireless charging station.

Example 11. The USB-PD IC controller of example 9 or 10, wherein the wireless charging station has a fixed operating frequency, and wherein in response to a power change command issued by a wireless charging device in charging proximity of the wireless charging station, the logic is configured to change the level of the voltage provided by the voltage regulator.

Example 12. The USB-PD IC controller of example 11, wherein in response to an increase power change command issued by the wireless charging device, the logic is configured to increase the level of the voltage provided by the voltage regulator.

Example 13. The USB-PD IC controller of example 11 or 12, wherein in response to a decrease power change command issued by the wireless charging device, the logic is configured to decrease the level of the voltage provided by the voltage regulator.

Example 14. The USB-PD IC controller of any of examples 9 through 13, wherein for power requests greater than 15 W from a wireless charging device in charging proximity of the wireless charging station, the logic is configured to change the level of the voltage provided by the voltage regulator and the operating frequency or duty cycle of the wireless charging station.

Example 15. The USB-PD IC controller of any of examples 1 through 14, wherein in response to an over-current or over-voltage condition, the logic is configured to autonomously reduce the level of the voltage output by the USB power adaptor while maintaining operation of the wireless charging station.

Example 16. A method of operating a wireless charging system, the method comprising: receiving power at a first Universal Serial Bus (USB) port of a USB-Power Delivery (USB-PD) integrated circuit (IC) controller from a USB power adaptor; providing power at a second port of the USB-PD IC controller to a wireless charging station; and controlling, via the USB-PD IC controller, a level of a voltage output by the USB power adaptor and an output power level of the wireless charging station, wherein an input voltage of the wireless charging station corresponds to the voltage output by the USB power adaptor or is derived from the voltage output by the USB power adaptor.

Example 17. The method of example 16, wherein controlling, via the USB-PD IC controller, the output power level of the wireless charging station comprises: maintaining an operating frequency of the wireless charging station in a range above a resonant frequency of the wireless charging station; in response to an increase power change command issued by a wireless charging device in charging proximity of the wireless charging station, decreasing the operating frequency within the range; and in response to a decrease power change command issued by the wireless charging device, increasing the operating frequency within the range.

Example 18. The method of example 16 or 17, wherein the wireless charging station has a fixed operating frequency, and wherein controlling, via the USB-PD IC controller, the output power level of the wireless charging station comprises: in response to a power change command issued by a wireless charging device in charging proximity of the wireless charging station, changing the level of the voltage output by the USB power adaptor.

Example 19. The method of any of examples 16 through 18, wherein the input voltage of the wireless charging station is provided by a voltage regulator that is configured to regulate the input voltage of the wireless charging station based on the voltage output by the USB power adaptor, and wherein controlling, via the USB-PD IC controller, the output power level of the wireless charging station comprises: in response to a power change command issued by a wireless charging device in charging proximity of the wireless charging station, changing the level of the voltage provided by the voltage regulator.

Example 20. The method of any of examples 16 through 19, wherein controlling, via the USB-PD IC controller, the output power level of the wireless charging station comprises: for power requests greater than 15 W from a wireless charging device in charging proximity of the wireless charging station, changing the level of the voltage provided by the voltage regulator and the operating frequency or duty cycle of the wireless charging station.

Example 21. The method of any of examples 16 through 20, wherein controlling, via the USB-PD IC controller, the output power level of the wireless charging station comprises: in response to an over-current or over-voltage condition, autonomously reducing the level of the voltage output by the USB power adaptor while maintaining operation of the wireless charging station.

Example 22. A wireless charging system, comprising: a Universal Serial Bus (USB) power adaptor configured to interface with a power source and output a voltage based on the power source; a wireless charging station configured to wirelessly charge a device in charging proximity of the wireless charging station; and a USB-Power Delivery (PD) integrated circuit (IC) controller coupled to both the USB power adaptor and the wireless charging station, wherein the USB-PD IC controller is configured to control a level of the voltage output by the USB power adaptor and to control an output power level of the wireless charging station, wherein an input voltage of the wireless charging station corresponds to the voltage output by the USB power adaptor or is derived from the voltage output by the USB power adaptor.

Example 23. The wireless charging system of example 22, wherein for power requests greater than 15 W from the device in charging proximity of the wireless charging station, the USB-PD IC controller is configured to change the level of the voltage provided by the USB power adaptor and the operating frequency or duty cycle of the wireless charging station.

Example 24. The wireless charging system of example 22 or 23, wherein in response to an over-current or over-voltage condition, the USB-PD IC controller is configured to autonomously reduce the level of the voltage output by the USB power adaptor while maintaining operation of the wireless charging station.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A Universal Serial Bus (USB)-Power Delivery (PD) integrated circuit (IC) controller, the USB-PD IC controller comprising:
    a first USB port configured for coupling the USB-PD IC controller to a USB power adaptor;
    a second port configured for coupling the USB-PD IC controller to a wireless charging station; and
    logic configured to control a level of a voltage output by the USB power adaptor and to control an output power level of the wireless charging station, wherein an input voltage of the wireless charging station corresponds to the voltage output by the USB power adaptor or is derived from the voltage output by the USB power adaptor.

2. The USB-PD IC controller of claim 1, wherein in response to a power change command issued by a wireless charging device in charging proximity of the wireless charging station, the logic is configured to change the level of the voltage output by the USB power adaptor and/or an operating frequency or duty cycle of the wireless charging station.

3. The USB-PD IC controller of claim 1, wherein the logic is configured to maintain an operating frequency of the wireless charging station in a range above a resonant frequency of the wireless charging station, and wherein in response to an increase power change command issued by a wireless charging device in charging proximity of the wireless charging station, the logic is configured to decrease the operating frequency within the range.

4. The USB-PD IC controller of claim 1, wherein the logic is configured to maintain an operating frequency of the wireless charging station in a range above a resonant frequency of the wireless charging station, and wherein in response to a decrease power change command issued by a wireless charging device in charging proximity of the wireless charging station, the logic is configured to increase the operating frequency within the range.

5. The USB-PD IC controller of claim 1, wherein the wireless charging station has a fixed operating frequency, and wherein in response to a power change command issued by a wireless charging device in charging proximity of the wireless charging station, the logic is configured to change the level of the voltage output by the USB power adaptor.

6. The USB-PD IC controller of claim 5, wherein in response to an increase power change command issued by the wireless charging device, the logic is configured to increase the level of the voltage output by the USB power adaptor.

7. The USB-PD IC controller of claim 5, wherein in response to a decrease power change command issued by the wireless charging device, the logic is configured to decrease the level of the voltage output by the USB power adaptor.

8. The USB-PD IC controller of claim 1, wherein for power requests greater than 15 W from a wireless charging device in charging proximity of the wireless charging station, the logic is configured to change the level of the voltage output by the USB power adaptor and an operating frequency or duty cycle of the wireless charging station.

9. The USB-PD IC controller of claim 1, wherein the input voltage of the wireless charging station is provided by a voltage regulator that is configured to regulate the input voltage of the wireless charging station based on the voltage output by the USB power adaptor, and wherein the logic is configured to control the voltage regulator.

10. The USB-PD IC controller of claim 9, wherein in response to a power change command issued by a wireless charging device in charging proximity of the wireless charging station, the logic is configured to change the level of the voltage provided by the voltage regulator and/or an operating frequency or duty cycle of the wireless charging station.

11. The USB-PD IC controller of claim 9, wherein the wireless charging station has a fixed operating frequency, and wherein in response to a power change command issued by a wireless charging device in charging proximity of the wireless charging station, the logic is configured to change the level of the voltage provided by the voltage regulator.

12. The USB-PD IC controller of claim 11, wherein in response to an increase power change command issued by the wireless charging device, the logic is configured to increase the level of the voltage provided by the voltage regulator.

13. The USB-PD IC controller of claim 11, wherein in response to a decrease power change command issued by the wireless charging device, the logic is configured to decrease the level of the voltage provided by the voltage regulator.

14. The USB-PD IC controller of claim 9, wherein for power requests greater than 15 W from a wireless charging device in charging proximity of the wireless charging station, the logic is configured to change the level of the voltage provided by the voltage regulator and an operating frequency or duty cycle of the wireless charging station.

15. The USB-PD IC controller of claim 1, wherein in response to an over-current or over-voltage condition, the logic is configured to autonomously reduce the level of the voltage output by the USB power adaptor while maintaining operation of the wireless charging station.

16. A method of operating a wireless charging system, the method comprising:
receiving power at a first Universal Serial Bus (USB) port of a USB-Power Delivery (USB-PD) integrated circuit (IC) controller from a USB power adaptor;
providing power at a second port of the USB-PD IC controller to a wireless charging station; and
controlling, via the USB-PD IC controller, a level of a voltage output by the USB power adaptor and an output power level of the wireless charging station, wherein an input voltage of the wireless charging station corresponds to the voltage output by the USB power adaptor or is derived from the voltage output by the USB power adaptor.

17. The method of claim 16, wherein controlling, via the USB-PD IC controller, the output power level of the wireless charging station comprises:
maintaining an operating frequency or duty cycle of the wireless charging station in a range above a resonant frequency of the wireless charging station;
in response to an increase power change command issued by a wireless charging device in charging proximity of the wireless charging station, decreasing the operating frequency within the range; and
in response to a decrease power change command issued by the wireless charging device, increasing the operating frequency within the range.

18. The method of claim 16, wherein the wireless charging station has a fixed operating frequency, and wherein controlling, via the USB-PD IC controller, the output power level of the wireless charging station comprises:
in response to a power change command issued by a wireless charging device in charging proximity of the wireless charging station, changing the level of the voltage output by the USB power adaptor.

19. The method of claim 16, wherein the input voltage of the wireless charging station is provided by a voltage regulator that is configured to regulate the input voltage of the wireless charging station based on the voltage output by the USB power adaptor, and wherein controlling, via the USB-PD IC controller, the output power level of the wireless charging station comprises:
in response to a power change command issued by a wireless charging device in charging proximity of the wireless charging station, changing the level of the voltage provided by the voltage regulator.

20. The method of claim 16, wherein controlling, via the USB-PD IC controller, the output power level of the wireless charging station comprises:
for power requests greater than 15 W from a wireless charging device in charging proximity of the wireless charging station, changing the level of the voltage provided by the voltage regulator and an operating frequency or duty cycle of the wireless charging station.

21. The method of claim 16, wherein controlling, via the USB-PD IC controller, the output power level of the wireless charging station comprises:
in response to an over-current or over-voltage condition, autonomously reducing the level of the voltage output by the USB power adaptor while maintaining operation of the wireless charging station.

22. A wireless charging system, comprising:
- a Universal Serial Bus (USB) power adaptor configured to interface with a power source and output a voltage based on the power source;
- a wireless charging station configured to wirelessly charge a device in charging proximity of the wireless charging station; and
- a USB-Power Delivery (PD) integrated circuit (IC) controller coupled to both the USB power adaptor and the wireless charging station,
- wherein the USB-PD IC controller is configured to control a level of the voltage output by the USB power adaptor and to control an output power level of the wireless charging station, wherein an input voltage of the wireless charging station corresponds to the voltage output by the USB power adaptor or is derived from the voltage output by the USB power adaptor.

23. The wireless charging system of claim 22, wherein for power requests greater than 15 W from the device in charging proximity of the wireless charging station, the USB-PD IC controller is configured to change the level of the voltage provided by the USB power adaptor and an operating frequency or duty cycle of the wireless charging station.

24. The wireless charging system of claim 22, wherein in response to an over-current or over-voltage condition, the USB-PD IC controller is configured to autonomously reduce the level of the voltage output by the USB power adaptor while maintaining operation of the wireless charging station.

* * * * *